May 31, 1960 D. M. ZABRISKIE 2,938,761

FACSIMILE STYLUS AND DAMPING MECHANISM

Filed March 19, 1957

INVENTOR.
D. M. ZABRISKIE

BY M. J. Reynolds

ATTORNEY

United States Patent Office 2,938,761

Patented May 31, 1960

2,938,761

FACSIMILE STYLUS AND DAMPING MECHANISM

Douglas M. Zabriskie, Northvale, N.J., assignor to The Western Union Telegraph Company, New York, N.Y., a corporation of New York Filed Mar. 19, 1957, Ser. No. 647,027

9 Claims. (Cl. 346—139)

This invention relates to a stylus mechanism for a stylus recorder and more particularly to damping means for preventing deleterious vibration of the stylus due to the high speed movement of the stylus in contact with the recording sheet.

The present application is a continuation-in-part of an application of Wise and Zabriskie, U.S. Serial No. 470,628, filed November 23, 1954, and entitled "Facsimile Apparatus for Use in Producing Tickets, Messages and the Like," now Patent No. 2,872,275, issued February 3, 1959, and reference is made thereto for a full disclosure of the structural details of the facsimile apparatus with which the present invention is adapted for use.

In the aforesaid application a facsimile recorder is disclosed in which a ticket form comprising a dry electrosensitive recording blank is rolled into a cylindrical tube such that a portion of the inner surface of the rolled ticket form may be scanned and marked by a rotating electrical stylus within the tube, in accordance with the incoming facsimile signals from the coupon at the ticket center. The stylus employed for such recording comprises a fine tungsten wire, approximately 8 mils in diameter, carried by a stylus holder and having its free end movable into contact with the inner face of the recording blank and rotatable relative to such surface during a scanning operation. The pressure of the stylus against the paper must be relatively light to prevent digging into the blank or scratching the electrosensitive coating thereon, and is determined largely by the flexibility of the stylus wire. In order to obtain the desired flexibility of the stylus, a wire of considerable length, of the order of one inch, is desirable. The stylus also preferably has its blank-engaging end disposed substantially at right angles to the blank, as distinguished from a trailing action, in order to obtain the minimum area of contact therewith. Due to the long unsupported length of the thin stylus wire, the desired right angle of contact thereof with the surface of the blank and the definite but light pressure of the stylus end therewith, a relatively high frequency vibration of the stylus wire is produced during the high speed rotative movement thereof in contact with the blank. This vibration is clearly audible, which in itself is objectionable, but of greater importance it causes uneven contact of the stylus end with the blank which impairs the recording.

An object of the present invention is to limit or reduce to a negligible amount the vibration of a rotating stylus of the above described nature.

A further object is to provide means in association with a recording stylus structure which is effective to dampen the undesired vibrations of a thin and relatively long resilient stylus member.

A further object is to provide means for applying a stabilizing force to a stylus wire during rotation thereof in a scanning movement and in a manner to maintain uniform contact of the stylus with the recording surface.

Other objects and advantages will hereinafter appear.

In accordance with one embodiment of the invention the thin long stylus wire is brought into resilient frictional engagement at a suitable point intermediate its ends with a rigid member whereby vibration of the stylus end is frictionally resisted. In a further form a weighted member having centrifugal resilience is forced into light contact with the stylus wire to apply the desired resistance to the radial or linear vibratory movement of the straight end.

The invention will best be understood by reference to the accompanying drawings in which.

Figure 1:
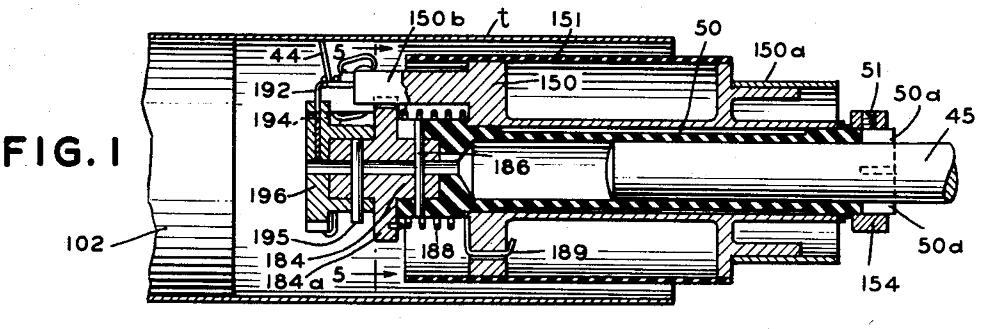
Fig. 1 is a longitudinal sectional view of the recording stylus mechanism.
Figure 2:
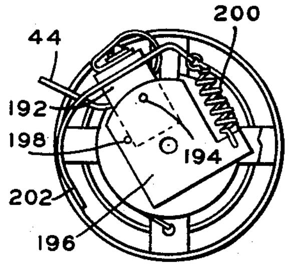
Fig. 2 is a left hand end view of the recording stylus mechanism of Fig. 1.

Referring first to Figs. 1 to 4, the stylus assembly there shown comprises a stylus holder drum 150, Fig. 1, mounted on a sleeve 50, the drum being electrically insulated from the drive shaft 45 by means of the sleeve which is composed of insulating material. The drum 150 is intercoupled with, and is rotated in one direction, by the sleeve 50 through a helical spring 188, the spring also enabling rotation of the drum in a reverse direction through a predetermined angle relative to the sleeve 50 for reasons hereinafter set forth. The sleeve is rotated by the driving shaft 45 and is adjustable around the shaft for phasing purposes. When a proper phasing position on the sleeve initially is obtained, the sleeve is clamped to the shaft 45 by a set screw 51 in a collar 154; tightening the set screw compresses the split end **50*a* of the sleeve between the collar 154 and the shaft 45. A sleeve 151, preferably of insulating material, encloses the drum 150**, and is movable into the cylindrical ticket form blank *t*, which is wrapped around a drum 102 with one end of the blank protruding to the right of drum 102, as seen in Fig. 1. During scanning the drum 102 and blank *t* are stationary while the stylus supporting assembly rotates within and moves axially of the blank to effect the desired scanning or recording operation.

The drum 150 has a portion **150*a*, Fig. 1, which performs the combined functions of a braking surface and a slip ring. Coacting with the portion 150*a* are two brake shoes 156, seen in Fig. 6, which are pivotally mounted at 158 so that the shoes are self-centering. Each brake shoe is carried by a lever 160 which at its upper end is pivotally mounted at 162 to a bracket 170. The two levers are drawn together by a coil spring 164 which causes the brake shoes normally to exert a braking action on the surface 150*a* of the drum 150 and places a sufficient drag thereon to tension the torsional spring 188, Fig. 1, for the purpose explained below. A lever 166, pivotally mounted at 168 on the bracket 170, when actuated by a solenoid 172 operates to spread the levers 160 apart, against the tension of the spring 164, and release the brake shoes 156. The portion 150*a* also operates as a slip ring with a brush 178 to conduct the incoming facsimile signals to the rotating recording stylus. Brush 178 is insulated from the bracket 170 by its mounting 180 held by screws 182**.

The insulating sleeve 50, Fig. 1, carries a metallic stylus-mounting hub member 184 secured thereto by a pin 186. The hub has a flanged portion 184*a* which is notched to form stop lugs or shoulders 184*b* and 184*c*, seen in Fig. 5. Surrounding the sleeve 50 is the helical spring 188, one end of which is anchored at 189 in drum 150, the other end being secured to the flange 184*a*. The spring 188 exerts a resilient turning force between drum 150 and the hub 184 to cause an arm 150*b* normally to abut against the shoulder 184*c*, Fig. 5. The application of the brake shoes 156 and the continued rotation of the shaft 45 and member 50 through a slight angle winds the spring and also causes relative rotation between the arm 150*b* and the hub 184 until the shoulder 184*b* abuts the arm 150*b*. The relative movement between 150*b* and 184, due to the selective application and release of the brake shoes, is used (1) to retract the stylus 44 through a predetermined angle and prevent the engagement thereof with the ticket form during the wrapping and tube-forming operation, (2) to then permit the spring 188 to expand and rotate the stylus into contact with the wrapped tube for a recording operation, and (3) to again retract the stylus for the unwrapping and carriage return operations.

Figure 3:
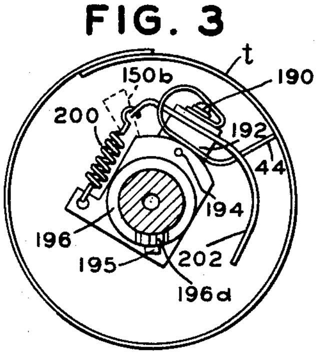
Fig. 3 shows the other side of the stylus mechanism with the stylus in contact with a rolled ticket blank for a recording operation.
Figure 4:
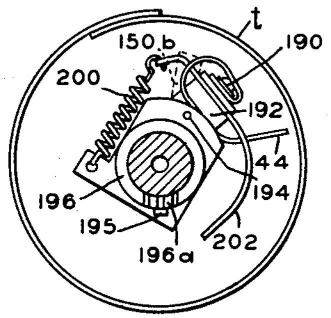
Fig. 4 shows the stylus in retracted position.

The recording stylus 44, Figs. 1 to 4, preferably comprises a fine tungsten wire, approximately 8 mils in diameter, having the fixed end thereof secured in any suitable manner, as by a screw 190 secured to an L-shaped lever 192 which is combed in a slot in a cap 196 and pivotally mounted at 194 to the cap. The cap slides over the hub 184 with a close fit and has a slotted portion 196*a* that receives a pin 195 that passes through the hub 184 so that the cap is rotated by the hub. The lever 192 is rotatable about the pivot 194 and is biased towards a stop pin 198 by a coil spring 200. When the lever 192 is against the stop pin, the end of the stylus 44 is in contact with the inner surface of the cylindrical ticket form *t* for a recording operation, this position of the stylus being shown in Fig. 3. Fig. 4 shows the stylus in its retracted position due to the movement of the arm 150*b* hereinbefore referred to, the arm having engaged and rotated the lever 192, against the tension of spring 200, to rotate and retract the stylus.

The desired degree of stylus pressure on the ticket form is obtained and determined principally by the resiliency of the tungsten wire 44. For this purpose the stylus wire is curved or coiled rearwardly or counterclockwise, as seen in Fig. 3, from the anchor screw 190 toward the free end thereof to impart the desired spring action or resiliency thereto for pressing the end thereof against the blank *t* with the proper degree of pressure. The free end of the stylus is substantially straight and contacts the blank approximately at right angles thereto. This is desirable to prevent the end of the stylus from wearing to an elliptical shape. A straight end of the stylus wire passes between the legs of a hairpin-shaped guard member 202 carried by the lever 192. As previously stated, due to the light resiliency of the stylus wire and its right angle contact with the paper, any irregularities or roughness of the inner electrosensitive surface of the blank *t* or the overlapped ends thereof sets up rapid and severe sustained vibrations of the stylus wire, presumably at the natural frequency of the spring wire stylus, causing the free end thereof to move radially of the surface of the blank and thus causing variable pressure of the stylus on the blank which varies the resistance between the end of the signal current carrying stylus and the electroconductive recording sheet, thereby impairing the quality of the reproduction.

Such impairment of the recording due to increased contact resistance results in decreased signal input to the marking surface of the blank and thus causes decreased intensity or fading of the marked area. The vibration is often of sufficient intensity to cause the stylus to lose contact with the surface of the blank, thus causing skips or blank areas in the recording. Arcing also occurs between the blank and the vibrating end of the stylus and this results in spreading or blurring of the recorded area and in some cases charring of the surface.

In addition to the fading, skipping, blurring and charring effects due to the linear or radial vibration of the stylus end, there is a tendency for the long flexible stylus to wander laterally and thus fail to properly track.

In order to eliminate this vibration or reduce it to a negligible amount and further to limit the lateral wandering and to hold the travel of the stylus in its proper path, the stylus wire is mounted upon the stylus holder or bracket by means of the screw 190, in such manner that the stylus wire may be adjusted about the axis of the screw so as to bring the wire, near its free end, into light frictional spring contact with one leg of the rigid guard 202. This resilient contact must be adjusted to produce sufficient resilient friction between the stylus wire and the guard member to properly dampen or resist the undesired radial movement or vibration of the end of the stylus wire but still be sufficiently light so as not to override the resilient force of the curved or spring portion of the stylus wire and thus prevent the stylus end from properly contacting and following the contour of the blank *t*, which it will be understood may not be completely cylindrical due to the unsupported length thereof beyond the supporting cylinder 102. This spring or frictional contact of the stylus wire and guard 202, being relatively close to the free end of the stylus wire also serves to hold the stylus against lateral wandering.

While the stylus vibration and the effective elimination thereof has been described with particular reference to an internally rotating stylus it is to be understood that the same considerations apply to a stationary stylus which is held into engagement with a rotating recording blank as in normal external scanning.

As indicated above, the adjustment of the stylus pressure against the guard 202 is somewhat critical although there is sufficient latitude in this adjustment so that it may be readily accomplished by a trained maintenance worker. However, in Figs. 7 and 8 I have shown modifications which do not require this careful adjustment, thus permitting stylus replacements to be made by ordinary operating personnel.

Figures 5, 6, 7, 8:
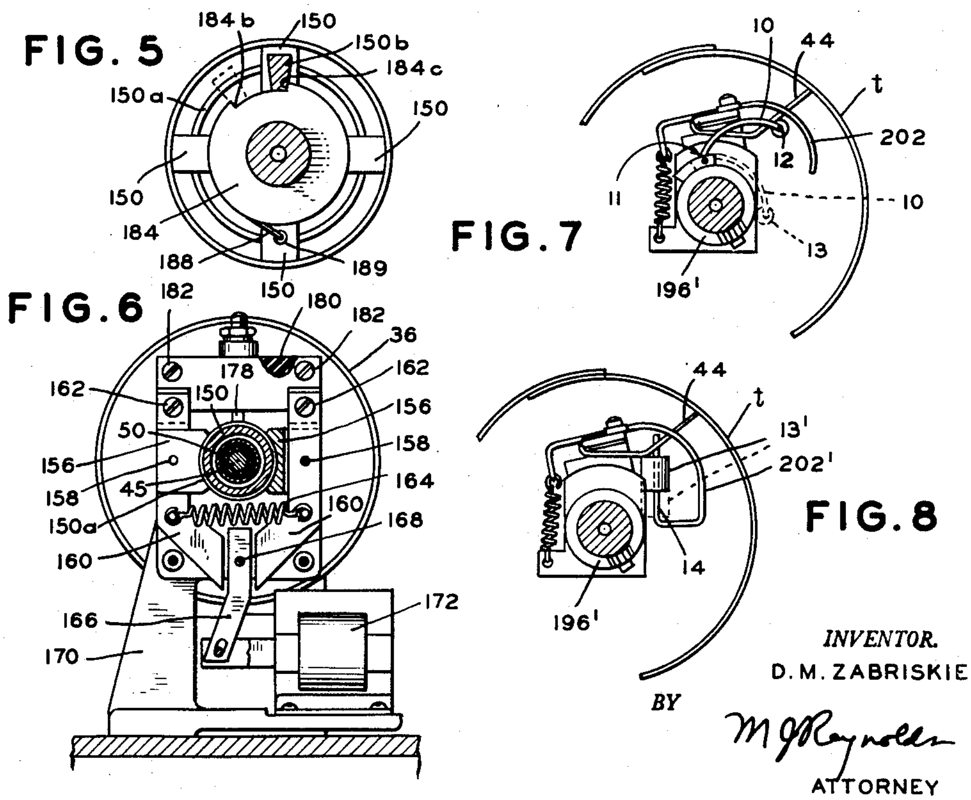
Fig. 5 is a sectional view taken along the line 5—5 of Fig. 1.
Fig. 6 shows details of a brake mechanism employed in connection with controlling the position of the stylus.
Fig. 7 is an end view of the stylus assembly showing a modified stylus damping means employing centrifugal action.
Fig. 8 is a further modification employing centrifugal braking or snubbing of the stylus vibration.

Referring first to Fig. 7, the stylus mount shown is substantially the same form as that illustrated in Figs. 3 and 4, except that it includes as separate means a curved lever 10 pivoted at one end to a pin 11 which extends through an enlargement of the hub 196'. The lever 10 at its free end is bent at 12 to extend parallel to the axis of the rotatable stylus assembly in such position as to bridge the loop guard 202 when the lever is raised to the full line position. A light sleeve 13, which may be of aluminum or a suitable fiber or plastic, is loosely mounted on the bent end of the lever 10. When the stylus is at rest the weight 13 normally lies against the hub 196', as shown in dotted lines, but upon rotation of the stylus assembly during a scanning or recording operation, the weight is thrown outwardly by centrifugal force to engage the stylus wire adjacent the straight end portion thereof as shown in full lines to apply the desired light resilient load thereto. The amount of this resilient pressure depends upon the size or weight of the dampening roller which it will be understood may be selected to produce the required damping pressure. It will be understood in the modification of Fig. 7 that the stylus wire 44 is adjusted to move freely within the loop of the guard 202 so that the sole damping force thereon is that applied by the centrifugally operated weight.

The modification of Fig. 8 is similar in principle to that of Fig. 7 but differs therefrom in the mounting of the centrifugally operated weight. In this form the guard 202' comprises a substantially D-shaped rigid wire with the tubular weight 13' loosely and slidably mounted on the vertical arm 14 thereof for movement against the end of the stylus wire, from the dotted to the full line position, under the rotating movement of the stylus assembly.

It is to be understood that other forms of dampening of the stylus may be utilized without departing from the spirit or essential attributes of the invention, which is not to be regarded as limited except as indicated by the scope of the appended claims.

What is claimed is:

1. A stylus mechanism for a facsimile recorder in which a recording sheet is wrapped into a cylindrical form for helical scanning, comprising a resilient stylus wire of substantially uniform diameter, a stylus holder, means for rigidly securing said stylus wire, at one end thereof, to said stylus holder, said stylus wire having a straight free end portion for engagement with the surface of said form substantially radially thereof for marking the same in accordance with applied facsimile signals and a curved spring reversely bent to form a loop portion for applying said end portion to said surface with a light resilient pressure, means including a drive member for rotating said stylus holder for effecting relative scanning movement between said stylus wire and said cylindrical form and means carried by said drive member in pressure contact with said stylus wire at one point only along said straight portion thereof for suppressing endwise vibratory movement of said end portion.

2. A stylus mechanism for a facsimile recorder in which a recording sheet is wrapped into a cylindrical form for helical scanning, comprising a resilient stylus wire of substantially uniform diameter, a stylus holder, means for rigidly securing said stylus wire at one end thereof to said stylus holder, said stylus wire having a free end portion for engagement with the surface of said form substantially radially thereof for marking the same in accordance with applied facsimile signals and a curved spring reversely bent to form a loop portion for applying said end portion to said surface with a light resilient pressure, means including a drive member for rotating said stylus holder for effecting relative scanning movement between said stylus wire and said cylindrical form and means carried by said drive member for applying pressure to one point only of said stylus wire at a position intermediate said holder and said end for suppressing radial vibratory movement of said end portion during a scanning operation.

3. A stylus mechanism as described in claim 2 having means for effecting relative adjustment between said stylus wire and said pressure applying means, for adjusting said applied pressure.

4. A stylus mechanism as described in claim 2 in which said means for applying pressure comprises a rigid member disposed adjacent said stylus wire and means for adjusting said resilient stylus wire into contact with said rigid member.

5. A stylus mechanism as described in claim 2 in which said means for applying pressure to said stylus wire is movable into resilient engagement with said stylus wire during the rotative movement thereof.

6. A stylus mechanism as described in claim 2 in which said means for applying pressure to said stylus wire is movable by centrifugal action into resilient engagement with said stylus wire during the rotative movement thereof.

7. A stylus mechanism as described in claim 2 in which said means carried by said drive member comprises a vibration damping member, supporting means for said damping member for normally supporting said member adjacent the axis of rotation of said stylus, said member being movable outward from adjacent said axis, under centrifugal force, during rotative movement of said stylus, said supporting means serving to guide said member in said outward movement into engagement with said stylus wire.

8. A stylus mechanism as described in claim 2 in which said means carried by said drive member comprises a lever pivotally mounted at one end for rotation with said stylus holder, a weighted member carried by the free end of said lever, said weighted member normally being disposed out of contact with said stylus wire when said stylus holder is at rest and said stylus is retracted, said weighted member being movable by centrifugal force during a stylus rotative movement into frictional contact with said stylus wire in its form engaging position.

9. A stylus mechanism as described in claim 2 in which said means carried by said drive member comprises a guide member, a weighted member slidably mounted on said guide member, said weighted member normally being disposed out of contact with said stylus wire when said stylus holder is at rest and said stylus is retracted, said weighted member being movable along said guide member by centrifugal force during a stylus rotative movement into frictional contact with said stylus wire in its form engaging position.

References Cited in the file of this patent

UNITED STATES PATENTS

| | | |
|---|---|---|
| 2,511,837 | D'Humy et al. | June 20, 1950 |
| 2,568,306 | Stamper | Sept. 18, 1951 |
| 2,639,211 | Hallden et al. | May 19, 1953 |
| 2,719,775 | Erving | Oct. 4, 1955 |
| 2,741,530 | Hill | Apr. 10, 1956 |
| 2,742,339 | Stamper | Apr. 17, 1956 |